Figure 1:
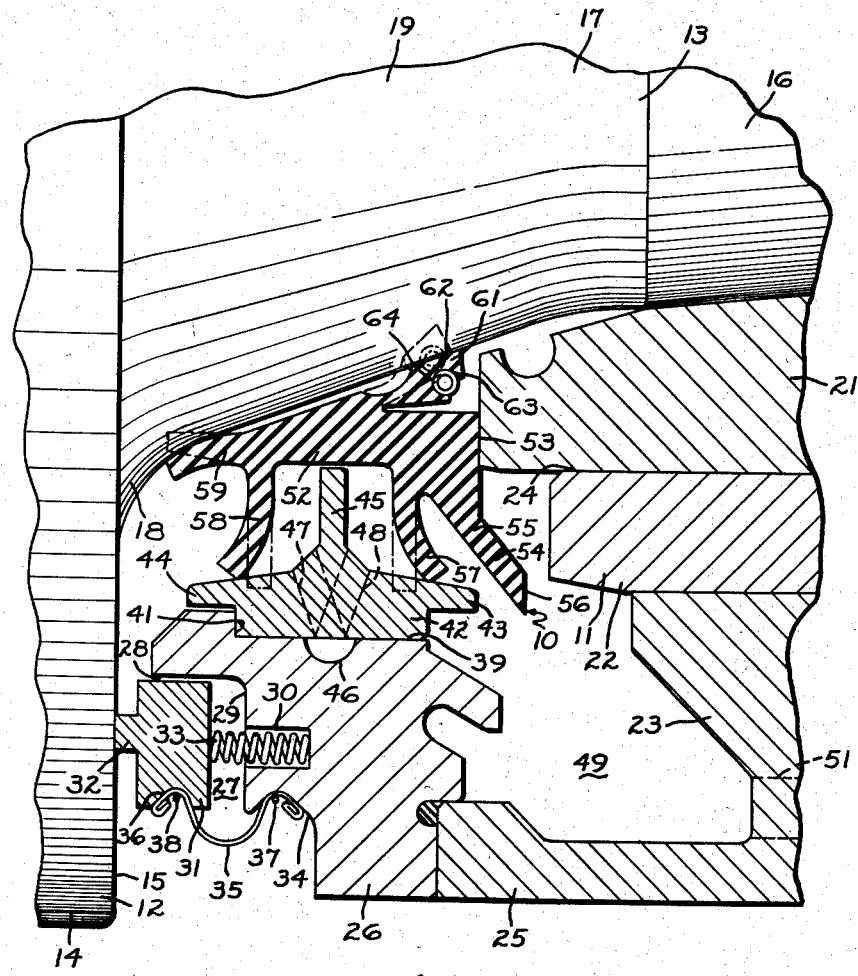

Jan. 13, 1959   C. A. RICH, JR   2,868,574
SEAL
Filed Sept. 13, 1957

INVENTOR.
Charles A. Rich Jr.
BY
Norman S. Blodgett
Attorney

United States Patent Office 2,868,574
Patented Jan. 13, 1959

2,868,574

SEAL

Charles A. Rich, Jr., Worcester, Mass., assignor to Morgan Construction Company, Worcester, Mass., a corporation of Massachusetts Application September 13, 1957, Serial No. 683,846

9 Claims. (Cl. 288—2)

This invention relates to a seal and more particularly to the construction and arrangement of a seal for excluding foreign matter such as water and scale from the roll neck bearings in a rolling mill.

In the rolling of hard metal bars, strips, sheets, etc., it is customary to apply large quantities of water to the roll and in the process much of the scale which is produced by oxidation of the stock is carried away by the water. If this water and scale reaches the roll neck bearings or mingles with the bearing lubricant, serious damage may result. Various types of seals have been employed heretofore to solve this problem, but these prior constructions have not proved to be entirely satisfactory. In some cases the seals have been complicated and expensive, and in other cases it has been necessary to use extreme precision in manufacture in order that the parts might be interchangeable to facilitate replacement. In still other cases the seals have failed to operate efficiently and foreign matter has not been excluded as desired. Certain prior seal constructions have been subject to rapid wear, with a comparatively short life of service. It is also important to collect the oil which has circulated through the bearings and prevent appreciable loss by leakage thereof.

It is therefore an outstanding object of the present invention to provide an improved construction of seal and associated parts for the inboard end of an oil roll neck bearing which will be highly effective in excluding water and scale and in avoiding escape of oil.

It is a further object of the invention to provide a sealing construction for the inboard end of a roll neck bearing which will be comparatively simple and inexpensive to manufacture and assemble.

Another object of this invention is the provision of a bearing seal which will be comparatively simple and inexpensive to manufacture.

A still further object of the instant invention is the provision of a roll neck bearing seal which will not require great precision in its manufacture and, yet, will be interchangeable with other similar seals to facilitate replacement of the seals when worn.

It is another object of the invention to provide a seal which will be highly efficient in excluding foreign matter from a bearing and in returning internal oil, which seal will remain efficient throughout a long life of service.

With these and other objects in view, as will be apparent to those skilled in the art, the invention resides in the combination of parts set forth in the specification and covered by the claims appended hereto.

The character of the invention may be best understood by reference to certain of its structural forms as illustrated by the accompanying drawings in which:

The single figure is a cross-sectional view of a seal and associated elements embodying the principles of the present invention.

Referring to the drawing, the seal, indicated generally by the reference numeral 10, is shown in use with a bearing 11 mounted on a roll 12. The roll comprises a barrel 14 having a plane end surface 15 and a roll neck 13. The roll neck has a tapered portion 16 and a transition portion 17. The inboard end of the transition portion 17 is formed with a curved billet 18 whereby a conical intermediate part 19 merges with the end surface 15 of the barrel of the roll. In a similar manner, the conical part 19 of the transition portion 17 is connected to the tapered portion 16 of the roll neck at its outboard end. The bearing 11 is of the flooded, oil-film type shown in the patent to Dahlstrom No. 2,018,055, granted October 22, 1935; it consists of a sleeve 21 surrounded by a bushing 22 which, in turn, is surrounded by a chock 23. The sleeve 21 is mounted on the tapered portion 16 of the roll neck 13 in such a manner as to rotate with the roll and the bushing 22 is locked to the chock 23 so that it remains fixed. Oil is introduced between the sleeve and the bushing and a separating oil film is formed along the line 24 between the two.

The chock 23 is provided with an inwardly-extending tubular flange 25 at the free or inboard end of which is mounted an annular inboard end plate 26. The end plate 26 and the flange 25 are locked together in liquid-tight relationship. The end plate 26 is formed with a recess 27 defined by a cylindrical surface 28 which extends at a right angle to the axis of the roll. Within the annular recess 27 is mounted a water seal ring 31 of annular form. The ring 31 is formed of phenolic resin or lead alloy and is provided with an axially-extending lip 32 adapted to rub against the end surface 15 of the barrel 14. A series of springs 33 extend from a pocket 30 in the end plate 26 to the water seal ring 31 to cause the lip 32 to press against the end surface 15. The end plate 26 is provided with an outwardly-extended annular groove 34 in which is mounted one end of a tubular boot 35 formed of a rubber-like material such as neoprene-coated fabric. The other end of the boot resides in a similar annular groove 36 formed on the surface of the seal ring 31. The boot ends are retained in their respective grooves by means of locking rings 37 and 38.

The inner portions of the end plate 26 are formed with a cylindrical surface 39 having a radial shoulder 41 at the end which is adjacent the barrel of the roll. In the annular area defined by the surface 39 and the shoulder 41 resides a T-ring 42 having axially-extending flanges 43 and 44 and intermediate thereof a radially-extending flange 45. The surface 39 is provided in its intermediate portion with a groove 46 which is annular and which is of semicircular cross sectional form. From the opposite sides of the flange 45 the T-ring 52 is provided with passages 47 and 48 which terminate on the surface of the T-ring which engages the surface 39 and the ends of the passages 47 and 48 lie within the groove 46. The chock 23, the end plate 26 and the T-ring 42 define a large annular chamber 49 and a passage 51 extends through the chock and opens in the chamber 49 and extends forwardly through the chock to a point of discharge, not shown.

Between the transition portion 17 of the roll neck the sleeve 21 and the T-ring 42 lies the seal 10, formed of a rubber-like material such as neoprene. The seal is annular in construction and retains the same form and cross-section around the entire circumference of the roll neck. It is provided with a main body 52 which has a radial plane surface 53 adapted to contact a similar radial end surface of the sleeve 21. Extending downwardly from the main body 52 and constituting an extension of the surface 53 is a slinger 54 of a flange-like configuration which slopes toward the outboard end of the roll neck. As is evident in the drawing, the flinger 54 is provided with an outwardly inclined surface 55 extending in the outboard direction between the surface 53 of the main body and a radial surface 56. Adjacent the flinger 54 is a flange 57 which normally extends radially, but in operation is curved by the pressure of contact with the upper surface of the flange 43 of the T-ring 42. At the other end of the main body is a similar flange 58 which is formed normally to extend radially, but is pressed in a curved configuration by pressure with the top surface of the flange 44 of the T-ring. Adjacent the flange 58 is a similar flange 59 which extends generally axially of the roll neck and which constitutes an extension of the main body 52. This flange 59 is normally inclined somewhat inwardly in the inboard direction, but by pressure with the transition surface 17 of the roll neck it is forced into a curved, outwardly-directed configuration, as shown in the drawing. From the inner surface of the tubular main body 52 extends another annular flange 61 located adjacent the end of the main body occupied by the surface 53 and extending inwardly and toward the outboard end of the seal. The flange 61 is formed with a conical surface 62 which is inclined inwardly in the outboard direction and normally makes contact with the transition surface 17 of the roll neck. On the surface of the flange 61 opposite the surface 62 is formed an inwardly-directed annular groove 63 in which is located a garter spring 64 which constitutes an endless annular coil. As is evident in the drawing, the flange 61 normally occupies a position as indicated in broken lines which is directed considerably more inwardly of the main body, but is retained in its outward solid line position by contact with the roll neck.

The operation of the apparatus will now be readily understood in view of the above description. During the operation of the rolling mill in which the seal is used the chock 23 and the bushing 22 are maintained in fixed positions within the housing of the rolling mill. The roll 12 rotates about its longitudinal axis and by cooperation with other similar rolls brings about the reduction of the metal stock. The sleeve 21 is fixed to the roll neck of the roll and rotates with it. Oil is introduced into the parting line between the sleeve 21 and the bushing 22 and provides lubrication therebetween to reduce friction to a minimum. The inboard end plate 26 and the T-ring 42 also remain in fixed position during the operation of the mill. The water seal ring 31 remains fixed along with the plate 26. The seal 10, however, rotates with the roll because of the considerable friction contact between the intermediate portion of the roll neck and the flanges 59 and 61. In particular, the action of the garter spring 64 in pressing the surface 62 against the transition surface of the roll neck has a strong effect in maintaining the seal fixed to the roll. During the operation of the mill, oil is introduced between the sleeve 21 and the bushing 22 and emerges along the line 24 into the chamber 49. As a matter of fact, in operation the oil emerges from between the bushing and sleeve in a stream which strikes the flinger 54 and due to centrifugal force, moves downwardly and in the outboard direction along the surface 55 until it arrives at the surface 56. At that time centrifugal force causes the oil to flow in a radial direction, striking the inner surface of the flange 25 of the chock 23 and flowing from the chamber 49 through the passage 51 back to the sump in the usual way. While the mill is operating, water is flowing over the stock being rolled and the water causes scale and foreign matter to leave the stock and mix with the water. Some of this water passes from the ends of the roll over the end surface 15 and attempts to flow inwardly toward the roll neck. This is prevented to a certain extent by the water seal ring 31 because of the pressure of the flange 32 against the end surface 15 of the roll. The entrance of water around the water seal ring by way of the space defined by the surfaces 29 and 28 of the inboard end seal 26 is prevented by the boot 35. The boot, being flexible, is able to move with the end seal ring and still prevent the entrance of water and foreign matter. During the operation of the mill, a grease or oil is introduced from an outside fitting, not shown, into the groove 46 in the inboard end plate 26. It is preferable for this application to an oil similar to the main bearing oil, to prevent contamination of the bearing oil. This lubricant flows up the passages 47 and 48 and emerges on either side of the flange 45. The grease thus introduced occupies the chamber defined by the T-ring 42 and the flanges 57 and 58 of the seal 10. The net effect of the presence of this grease is to wet the area of contact between the flange 58 of the seal and the upper surface of the flange 44 of the T-ring. In the same way, this grease lubricates the contact area between the flange 57 of the seal and the upper surface of the flange 43 of the T-ring. It can be seen, then, that any water which is able to get past the water seal ring 31 can gain entrance into the main part of the bearing and mix with the oil only by passing the flanges 58 and 57 of the seal or by passing between the seal 10 and the transition portion 17 of the roll neck. Passage around the flange 58 is prevented by its resilient contact with the upper surface of the flange 44 of the T-ring and the fact that this is well greased and lubricated. Any water that does pass this flange 58 finds it exceedingly difficult to get around the flange 45 of the T-ring 42 because of its inwardly-directed nature and the fact that its innermost edge resides closely adjacent to the cylindrical surface of the main body 52 of the seal. Any water which passes this part of the labyrinth must still pass the flange 57 which, because of its resilient nature, presses firmly against the upper surface of the flange 43 of the T-ring and is provided with water-inhibiting lubricant. Any tendency for water to flow along the roll neck is prevented by the very high pressure and broad areas of contact between the flange 59 and the transition portion 17 of the roll neck and between the surface 62 of the flange 61 and the same transition portion. If water were able to pass these two barriers, it still would have to find a way of passing between the end surface of the sleeve 21 and the radial surface 53 of the seal 10. By the same token, any attempt of oil from the bearing to escape must first pass the barrier presented by the flinger 54 and then must either pass the flanges 57, 45, 58 and 32 on one hand or pass by the surface 53, the flange 61, the flange 59 and the water seal ring flange 32 on the other hand. It can be seen, then, that the seal 10 cooperates with the other associated elements of the bearing and the rolling mill effectively to prevent the entrance of water into the bearing and to prevent the escape of oil from the bearing.

It is obvious that minor changes may be made in the form and construction of the invention, without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A seal formed in one piece of rubber-like material, comprising a tubular main body, a first annular flange extending outwardly from one end of the body at a right angle to the axis of the body, a second annular flange extending outwardly from adjacent the other end of the body at a right angle to the axis of the body, a third annular flange extending from the said one end of the body and constituting a general extension thereof, a fourth annular flange extending from the said other end of the body and being defined by two parallel conical surfaces, the fourth annular flange diverging outwardly in the direction away from the said one end of the body and terminating in an end surface which lies in a plane extending at a right angle to the axis of the body, a fifth flange extending inwardly of the body adjacent the said other end hereof, the fifth flange having an inner conical surface which extends inwardly in the direction of the said other end of the body, a groove formed in the fifth flange on a surface opposite the conical surface thereof, and a garter spring located in the said groove.

2. A seal for use with the inboard end of a roll neck bearing having an inwardly-directed annular flange associated with the outer bushing of the bearing, the seal being formed of rubber-like material, comprising a tubular main body, a first annular flange extending outwardly from adjacent one end of the body at a right angle to the axis of the body, a second annular flange extending from the other end of the body and constituting a general extension thereof, a third annular flange extending from the said one end of the body and being defined by two parallel conical surfaces, the third annular flange diverging outwardly in the direction away from the said other end of the body and terminating in an end surface which lies in a plane extending at a right angle to the axis of the body, a fourth flange extending inwardly of the body adjacent the said one end thereof, the fourth flange having an inner conical surface which extends inwardly in the direction of the said one end of the body, a groove formed in the fourth flange on a surface opposite the conical surface thereof, and an annular spring located in the said groove.

3. A seal for use with the inboard end of a roll neck bearing having an inwardly-directed annular flange associated with the outer bushing of the bearing, the seal being formed of rubber-like material, comprising a tubular main body, a first annular flange extending outwardly from one end of the body at a right angle to the axis of the body, a second annular flange extending from the said one end of the body and constituting a general extension thereof, a third annular flange extending from the other end of the body and being defined by two parallel conical surfaces, the third annular flange diverging outwardly in the direction away from the said one end of the body and terminating in an end surface which lies in a plane extending at a right angle to the axis of the body, a fourth flange extending inwardly of the body adjacent the said other end thereof, the fourth flange having an inner conical surface which extends inwardly in the direction of the said other end of the body, a groove formed in the fourth flange on a surface opposite the conical surface, and an annular spring located in said groove.

4. A seal for use with the inboard end of a roll neck bearing having an inwardly-directed annular flange associated with the outer bushing of the bearing, the seal being formed of rubber-like material, comprising a tubular main body, a first annular flange extending outwardly from one end of the body at a right angle to the axis of the body, a second annular flange extending outwardly from adjacent the other end of the body at a right angle to the axis of the body, a third annular flange extending from the said other end of the body and being defined by two parallel conical surfaces, the third annular flange diverging outwardly in the direction away from the said one end of the body and terminating in an end surface which lies in a plane extending at a right angle to the axis of the body, a fourth flange extending inwardly of the body adjacent the said other end thereof, the fourth flange having an inner conical surface which extends inwardly in the direction of the said other end of the body, a groove formed in the fourth flange on a surface opposite the conical surface, thereof, and spring means located in said groove.

5. A seal for use with the inboard end of a roll neck bearing having an inwardly-directed annular flange associated with the outer bushing of the bearing, the seal being formed of rubber-like material comprising a tubular main body, a first annular flange extending outwardly from one end of the body at a right angle to the axis of the body, a second annular flange extending outwardly from adjacent the other end of the body at a right angle to the axis of the body, a third annular flange extending from the said one end of the body and constituting a general extension thereof, a fourth flange extending inwardly of the body adjacent the said other end thereof, the fourth flange having an inner conical surface which extends inwardly in the direction of the said other end of the body, a groove formed in the fourth flange on the surface opposite the conical surface thereof, and a garter spring located in said groove.

6. A seal for use with the inboard end of a roll neck bearing having an inwardly-directed annular flange associated with the outer bushing of the bearing, the seal being formed of rubber-like material, comprising a tubular main body, a first annular flange extending outwardly from one end of the body at a right angle to the axis of the body, a second annular flange extending outwardly from adjacent the other end of the body at a right angle to the axis of the body, a third annular flange extending from the said one end of the body and constituting a general extension thereof, a fourth annular flange extending from the said other end of the body and being defined by two parallel conical surfaces, the fourth annular flange diverging outwardly in the direction away from the said one end of the body and terminating in an end surface which lies in a plane extending at a right angle to the axis of the body.

7. A seal for use with the inboard end of a roll neck bearing having a T-ring with an inwardly-directed annular flange associated with the outer bushing of the bearing, the seal being formed of a rubber-like material, comprising a tubular main body, an annular flange extending outwardly from the body at a right angle to the axis of the body to engage the T-ring adjacent the flange thereof, a flinger extending from one end of the body and being defined by two parallel conical surfaces, the flinger diverging outwardly in the direction away from the said other end of the body and terminating in an end surface which lies in a plane extending at a right angle to the axis of the body, a holding flange extending inwardly of the body adjacent the said one end thereof, the holding flange having an inner conical surface which extends inwardly in the direction of the said one end of the body, a groove formed in the holding flange on a surface opposite the conical surface thereof, and spring means located in said groove for resiliently biasing the holding flange against the roll neck.

8. A seal for use with the inboard end of a roll neck bearing having a T-ring with an inwardly-directed annular flange associated with the outer bushing of the bearing, the seal being formed of rubber-like material, comprising a tubular main body, an annular flange extending outwardly from the body at a right angle to the axis of the body to engage the T-ring adjacent the flange thereof, a flinger extending from one end of the body and diverging outwardly in the direction away from the other end of the body, the flinger terminating in an end surface which lies in a plane extending at a right angle to the axis of the body, a holding flange extending inwardly of the body adjacent the said one end thereof, the holding flange having an inner conical surface which extends inwardly in the direction of the said one end of the body, and spring means associated with the holding flange for resiliently biasing the holding flange against the roll neck.

9. A seal for use with the inboard end of a roll neck bearing having a T-ring with an inwardly-directed annular flange associated with the outer bushing of the bearing, the seal being formed of rubber-like material, comprising a tubular main body, an annular flange extending outwardly from the body at a right angle to the axis of the body to engage the T-ring adjacent the flange thereof, a flinger extending from one end of the body and diverging outwardly in the direction away from the other end of the body, a holding flange extending inwardly of the body adjacent the said one end thereof, the holding flange having an inner conical surface which extends inwardly in the direction of the said one end of the body, and means associated with the holding flange for resiliently biasing the holding flange against the roll neck.

References Cited in the file of this patent

UNITED STATES PATENTS

| | | |
|---|---|---|
| 2,523,604 | Vedovell | Sept. 26, 1950 |
| 2,676,041 | Englesson | Apr. 20, 1954 |

FOREIGN PATENTS

| | | |
|---|---|---|
| 851,707 | Germany | Oct. 6, 1952 |
| 986,710 | France | Apr. 4, 1951 |